United States Patent [19]

Wildenburg

[11] Patent Number: 5,541,144
[45] Date of Patent: Jul. 30, 1996

[54] PROCESS FOR PREPARING AN AMORPHOUS ULTRAHARD MATERIAL ON THE BASIS OF BORON NITRIDE

[75] Inventor: Jörg Wildenburg, Blumenthal, Germany

[73] Assignee: Firma Siegfried Golz, Blumenthal, Germany

[21] Appl. No.: 256,997

[22] PCT Filed: Feb. 9, 1993

[86] PCT No.: PCT/EP93/00314

§ 371 Date: Jul. 29, 1994

§ 102(e) Date: Jul. 29, 1994

[87] PCT Pub. No.: WO93/16015

PCT Pub. Date: Aug. 19, 1993

[30] Foreign Application Priority Data

Feb. 12, 1992 [DE] Germany .......................... 42 04 009.4

[51] Int. Cl.$^6$ ................................................. C04B 35/583
[52] U.S. Cl. ................... 501/96; 423/290; 51/307
[58] Field of Search .............. 501/96; 423/490; 51/307, 293

[56] References Cited

U.S. PATENT DOCUMENTS

| | | | |
|---|---|---|---|
| 4,551,316 | 11/1985 | Iizuka | 423/290 |
| 4,772,575 | 9/1988 | Ota et al. | 423/290 X |
| 4,960,734 | 10/1990 | Kanai et al. | 501/96 X |
| 5,230,873 | 7/1993 | Wildenburg et al. | 51/307 |

FOREIGN PATENT DOCUMENTS

| | | |
|---|---|---|
| 8018526 | 6/1982 | France . |
| 8219185 | 5/1983 | France . |
| 3045561 | 2/1991 | Japan . |
| 9002704 | 3/1990 | WIPO . |

OTHER PUBLICATIONS

Lorenz et al, "Influence of MgO on the growth of Cubic Boron Nitride Using Catalyst Mg3N2", J. of Mat. Sci. Letters, vol. 7 No. 1 Jan. 1988 pp. 23–24.

Bindal et al "Synthesis of Cubic Boron Nitride Using Magnesium As the Catalyst" J. of Cryst. Growth vol. 112, (1991) pp. 386–401.

*Primary Examiner*—Karl Group
*Attorney, Agent, or Firm*—Antonelli, Terry, Stout & Kraus

[57] ABSTRACT

A process for preparing amorphous ultrahard material based on boron nitride which has a hardness sufficient to scratch diamond uses hexagonal or turbostratic boron nitride hBN as starting material. The starting material is compressed at pressures of at least 70 Kbar and heated to temperatures of at least of 1650° C. until a boron nitride melt is obtained, the boron nitride melt is quenched by shutting off the heat supply and the quenched boron nitride melt is then relieved of the pressure. In the process, the hexagonal or turbostratic boron nitride employed as a starting material is treated in the presence of crystallisation inhibitors so that the formation of crystals is completely prevented and an amorphous structure is compacted by incorporation of reaction products comprising boron suboxides.

11 Claims, 6 Drawing Sheets

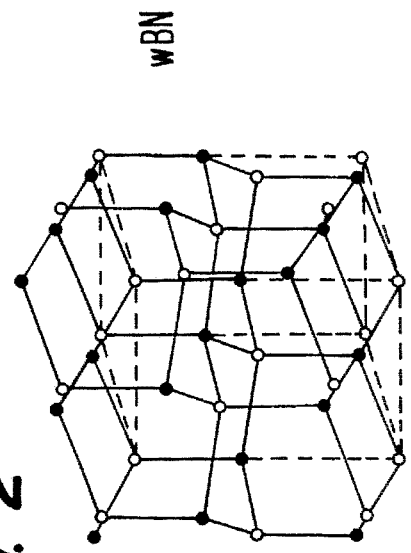
FIG. 2 wBN
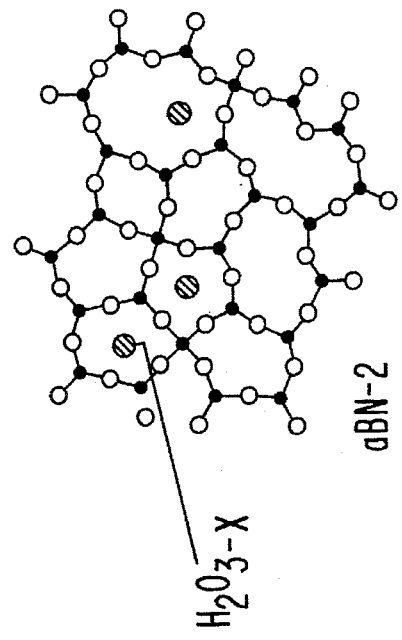
FIG. 4 aBN-2 $H_2O_3-x$
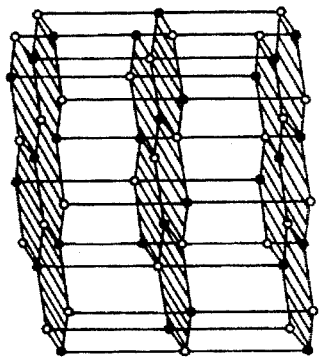
FIG. 1
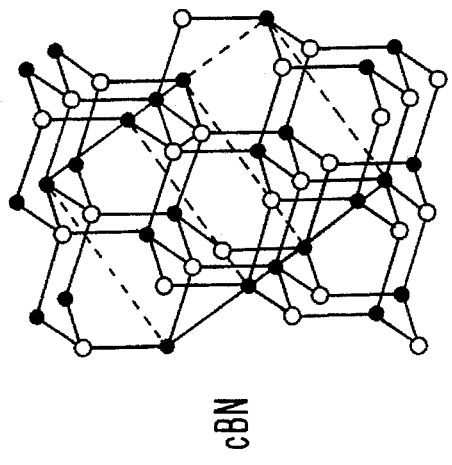
FIG. 3 cBN

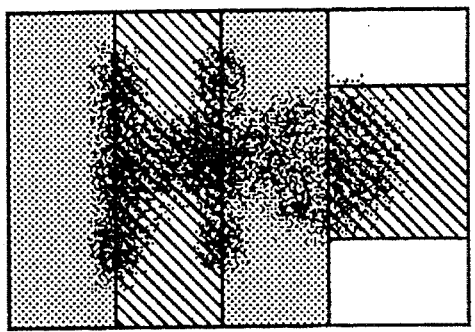
FIG. 8(3)
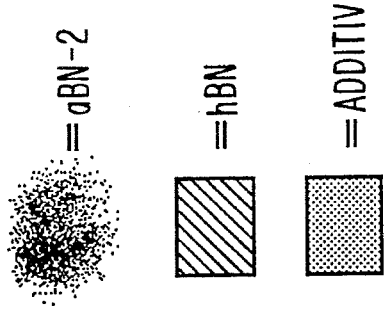
= aBN-2
= hBN
= ADDITIV
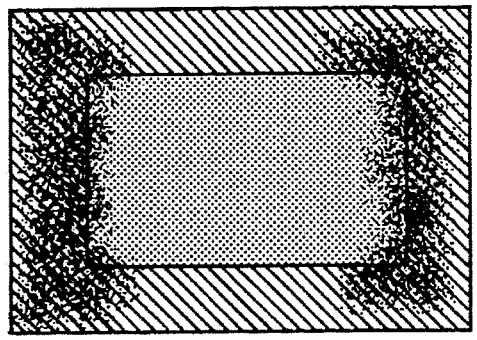
FIG. 8(2)
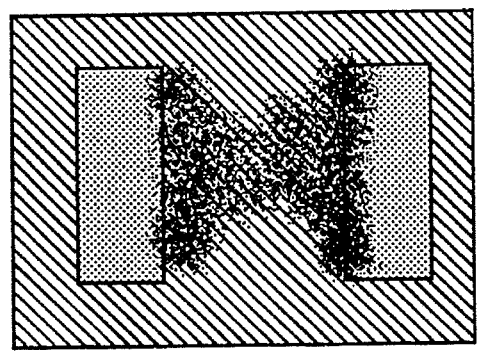
FIG. 8(5)
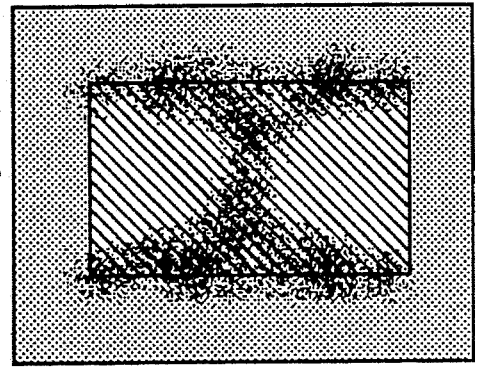
FIG. 8(1)
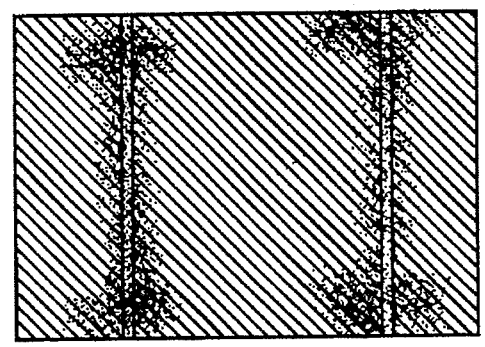
FIG. 8(4)

PROCESS FOR PREPARING AN AMORPHOUS ULTRAHARD MATERIAL ON THE BASIS OF BORON NITRIDE

BACKGROUND OF THE INVENTION

The invention relates to a process for preparing an amorphous ultrahard material based on boron nitride, starting from hexagonal or turbostratic boron nitride, which is compressed at pressures of at least 70 kbar or above and heated to temperatures of at least 1650° C. or above, until a boron nitride melt is obtained, and the boron nitride melt formed is quenched by shutting off the heat supply, and the quenched boron nitride melt is then relieved of the pressure.

A congeneric process for preparing ultrahard boron nitride, which is amorphous with respect to electron beams and X-rays, and which is designated as aBN-2, having a hardness sufficient to scratch diamond, is disclosed by WO 90/02704 and by the German Patent 38 30 840.

Industrial techniques for preparing single crystals or sintered bodies of cubic boron nitride make effective use of processes, in which the starting material of hexagonal or pyrolytic boron nitride, with the addition of crystallisation catalysts and solvent catalysts, is converted, at a high rate of conversion, into boron nitride having a cubic or wurtzite structure. Suitable references in this context include U.S. Pat. Nos. 4361 543, 3,192,015, 3,233,988 and 4,188,194.

A decisive factor in this process is the influence of the catalysts on the new growth of a crystalline boron nitride having a greater hardness, as well as a high temperature stability, than the starting material.

Three crystalline structures of boron nitride are known: a soft hexagonal form, also designated as white graphite, the hexagonal boron nitride hBN; a hard hexagonal wurtzite-type form similar to the hexagonal diamond structure, the so-called wurtzite-type boron nitride wBN, as well as a cubic zinc blende form, whose structure is similar to that of cubic diamond, and which is designated as cubic boron nitride cBN. In the accompanying drawing, FIG. 1 shows the crystal lattice and the crystal lattice layers of the hexagonal boron nitride hBN, FIG. 2 shows the wurtzite-type crystal lattice structure of the wBN, and FIG. 3 shows the crystal lattice structure of the cubic boron nitride cBN.

All three modifications of boron nitride are used in industry as powders or sintered solids, on the one hand as raw materials for syntheses, on the other hand as abrasive grain for use in tools. Sintered solids of cBN are also used as heat sinks in microelectronics.

With regard to the hard boron nitride phases which are processed into compact sintered solids, a distinction is made between types with self-binding of the grains or binding with the aid of a separate binder between the boron nitride grains. Both types have been used hitherto for producing nonporous sintered compacts. Owing to the admixture of less hard substances, the last-mentioned type, however, is less suitable for use in tools.

The direct conversion process from hBN to cBN or wBN is also feasible, see for example the Japanese Patents 49/27518, 49/30357, 49/22925, and the U.S. Pat. No. 3,852, 078, inter alia, which operates at pressures in a range above 50 kbar and at temperatures from 1100° to 3000° C.

In addition to the crystalline forms of boron nitride, there are at least two amorphous forms of different hardness. The first amorphous form is designated as aBN-1 or pBN, which stands for pyrolytic boron nitride. The amorphous boron nitride called aBN-1 or pBN is soft like hBN, see for example Japanese Published Specification 62-263962, and is produced without pressure in a CVD process. The second amorphous form of boron nitride is designated as aBN-2 and is notable for extremely high hardness, so that it is able to scratch, drill and mill diamond even in the (111) direction, as well as excelling by high temperature stability up to over 1450° C. Amorphous boron nitride aBN-2 of such ultrahardness is first described in the German Patent 3830 840. With regard to the aBN-1 (pBN) there is some dispute, see U.S. Pat. No. 4,188,194, whether there is not after all some order in the crystal structure, since the boron and nitrogen atoms, similarly to the graphite lattice of hBN, are preferentially linked on certain planes. These planes, however, are not crosslinked periodically in three dimensions.

All the industrially significant processes for preparing the hard boron nitride phases take place at high pressures and temperatures, since the action of a coercive external force and a supply of thermal energy are required to induce positional interchange of the atoms in the lattice of the starting materials and thus to obtain a new, denser structure. If substances with specific catalytic effects are introduced into the boron nitride, however, the conversion into a particular structural form is predetermined if sufficiently high pressures and temperatures are employed.

SUMMARY OF THE INVENTION

The object of the invention is to provide a further process for preparing amorphous ultrahard boron nitride, in which process the yield can be increased and/or the achievable grain sizes of amorphous boron nitride grains can be increased.

This object is achieved in the congeneric process according to the invention in that the starting material, i.e. hexagonal boron nitride or turbostratic boron nitride is treated in the presence of crystallisation inhibitors, i.e. is heated when compressed and is subsequently quenched.

According to the invention, crystallisation inhibitors are used which, releasing ions or molecules, react with the hexagonal boron nitride at pressures of at least 70 kbar and temperatures of at least 1650° C., and whose reaction products, in the process, are incorporated into or deposited in the crystal structure, i.e. the crystal layer structures of the hBN. Upon quenching of the boron nitride melt thus modified, a glassy, ultrahard substance based on boron nitride is obtained, which is amorphous, to be precise amorphous with respect to electron beams and X-rays. This new substance is able to scratch diamond even in the (111) direction. The method according to the invention of adding crystallisation inhibitors during the preparation process of an ultrahard amorphous material based on boron nitride, designated as amorphous boron nitride aBN-2, has a positive effect on the conversion process from hexagonal BN into amorphous aBN-2, as a result of which the percentage of converted boron nitride and of ultrahard amorphous boron nitride obtainable from the process is distinctly increased. Moreover, the grain size increases, and the internal tensions in the ultrahard aBN-2 grains obtained are reduced.

The conventional method of producing a glass, i.e. an amorphous material, is the so-called melt quenching process. If a material suitable for vitrification, such as $B_2O_3$, is heated to a sufficiently high temperature, it melts, and if it is cooled sufficiently quickly, it remains a glass. There are many other methods by which a material can be made amorphous. In some cases, there is more than one procedure to convert the same material into an amorphous stage. An amorphous substance, which has been obtained in different ways, has substantially different physical properties. By employing pressure during vitrification and by different cooling rates, glasses having completely different physical properties can be obtained. It is debatable whether all these forms can be regarded as identical, apart from the chemical composition. More likely, they are analogous to the polymorphic modifications in the crystalline state.

If the volume falls to values close to that of a crystalline substance, the volume shrinkage rate also drops, and the volume change behaviour is virtually equal to that of a crystalline substance. The egress from melt-like behaviour in the undercooling range below the melting point proper is distinctly dependent on the cooling rate. The slower the cooling takes place, the smaller is the volume of the glass. The egress temperature is also called glass transition temperature. The volume shrinkage goes hand in hand with an enormous increase of the glass viscosity. At the vitrification point the shear viscosity of the melt is around $10^{13}$ poise. If, in addition, the melt is subjected to an enormous external pressure, and the melt is then first quenched and the pressure is subsequently relieved, a special arrangement of the atoms is achieved which does not correspond to the equilibrium state.

A material such as BN, which forms very dense structures, can be converted according to the invention into a glass having completely novel physical properties. The additive auxiliaries employed according to the invention, in the form of the crystallisation inhibitors, stabilise the amorphous structure and prevent spontaneous recrystallisation. The mass ratio of the additives, depending on the auxiliary employed, may range from a few ppm up to several %.

According to the invention, the crystallisation inhibitors used are chemical substances, preferably chemical substances which release oxygen, so-called oxygen donors, which specifically inhibit the crystallisation process of hexagonal boron nitride or cubic boron nitride and which generate a boron nitride of an amorphous form which, at room temperature and atmospheric pressure, is metastable like diamond and has a corresponding hardness. According to the invention, the process for generating a cubic crystalline boron nitride phase from hexagonal boron nitride is reversed and, by using crystallisation inhibitors, is used to synthesise an amorphous ultrahard material based on a boron nitride of the type aBN-2. The starting material for this process is hexagonal boron nitride.

Advantageous further developments of the method according to the invention for preparing ultrahard amorphous boron nitride are set forth hereinafter.

A further improvement of the process according to the invention could be achieved in the context of introducing the crystallisation inhibitors into the boron nitride synthesis chamber, specifically with regard to optimum placement of the synthesis materials, particularly of the hBN and the crystallisation inhibitors with respect to one another in the reaction chamber, as well as the development of sufficiently effective concentrations of crystallisation inhibitors. To carry out the process according to the invention, an apparatus constructed as described in WO/90/02704 can be used, especially with regard to the design and incorporation of the inner reaction chamber, i.e. the design of the high-pressure insert, which contains the materials to be employed in preparing the ultrahard amorphous boron nitride. According to the invention, the design of the reaction chamber, i.e. the design of the high-pressure insert with regard to shielding in respect to heating, and with regard to mass transfer of the crystallisation inhibitors, was modified compared to what was known. In particular, heat irradiation from the heater towards the synthesis mixture, i.e. the boron nitride to be melted, was improved and furthermore a specific placement of the crystallisation inhibitors was found, as a result of which the rate of conversion from hBN into aBN-2 is improved. An essential improvement of the process is achieved by precompacting the hexagonal boron nitride as the starting material. Precompaction of this type is achieved, for example, in that the starting material, e.g. hBN, which like graphite has the form of layer- or platelet-like crystals, is stirred up using a dispersive liquid, and is then precompacted in a press. This precompacted starting material subsequently results, upon compressing of the synthesis mixture in the reaction chamber, using the high pressures and temperatures, in an orientation of the hexagonal boron nitride in platelet form, which has a positive effect on the structural and chemical reaction with the crystallisation inhibitors. The hBN platelets generated by precompaction, up to an axial pressure of approximately 40 kbar naturally are highly able to slide on one another, and are oriented to approximately 90% in the form of stacks, with the planing surfaces (0001) perpendicular to the main pressure axis. In the high-pressure apparatus used for the process according to the invention, at over 40 kbar there is increasing lateral supporting pressure in the reaction chamber, which results in a distribution of the hBN platelets in the form of two cones whose points are opposite to one another.

The hBN crystals thus controlled and oriented as a result of the precompacted hBN, as the temperature is increased, are only able to form bonds in specific spatial directions, preferentially the (0001) direction, as only in those directions are the atoms of the neighbouring crystals close enough to enter into a bond with one another. If now, according to the invention, a strong oxidant, such as chemical substances releasing oxygen, which are used as crystallisation inhibitors becoming active from a temperature of 1250° C., is made to act along the planing surfaces (0001) of the hBN crystals suitably positioned in the reaction chamber, the oxygen released penetrates the hBN platelets and crosslinks these inter alia by forming a boron suboxide ($B_2O_{3-x}$), where x can be a value from 0 to 2.9. This boron suboxide is incorporated, with a high probability, into the hexagonal channels of the boron nitride which are now parallel to the pressure axis.

As a result of the high pressure and the high temperature during the synthesis of the amorphous ultrahard boron nitride from hexagonal boron nitride, the B and N atoms of the hBN layers however also crosslink mutually and slowly dissolve the hexagonal crystal structure. According to the invention, a new network is formed as shown in FIG. 4 of the drawing, which network, owing to the presence of the boron suboxide, under pressure is not transformed into the cubic form of the boron nitride, but persists as an assembly of three-dimensionally randomly arranged atoms, due to the high synthesis temperature and the subsequent quenching under pressure. If this state is frozen, as it were, by abrupt temperature reduction according to the invention, the end product obtained of the synthesis is the desired ultrahard material based on amorphous aBN-2. The conversion rate is a function of the temperature gradient distribution in the reaction chamber, and it also responds to the percentage of the crystallisation inhibitor, which may also fluctuate locally in the reaction chamber.

For the purpose of precompacting the hexagonal boron nitride for the subsequent synthesis and conversion, solvent catalysts are used in preference.

In the case of distilled water, $H_2O$, as the solvent catalyst, the hBN is superficially solvated even upon the addition of small amounts of water, similarly to a hydrothermal synthesis process. Ammonium pentaborate tetrahydrate is formed, which is similarly present in amorphous form and, like a flux, accelerates the further dissolution of the hBN. Pressure and temperature lead to a strong solution effect of the water, which cannot evaporate, on the crystalline structure of the substances introduced, and provide high mass transfer in the synthesis chamber. According to the influence of the water, or alternatively of adsorbed moisture, the crystallisation inhibitors can be moved to the intended sites.

By varying the percentage of crystallisation inhibitor and solvent catalyst stepwise or zonewise, continuous transitions from the cBN to the aBN-2 structure are obtained. The literature on boron nitride frequently refers to the damaging effect of oxygen in cBN synthesis, see for example the study by Tadaosato, Hideohiraoka, Tadashiendo, Osamofukunago, Minoruivata "Effect of oxygen on the growth of cubic boron nitride using MG3 as catalyst" in the Journal of Materials Science 16 (1981) 29-1834.

Only as a result of this invention has it been possible to recognise the effect of oxygen as a crystallisation inhibitor in preparing ultrahard amorphous boron nitride and to make use of this effect in preparing the same. This is because, according to the invention, the incorporation of reaction products, such as here in the case of oxygen donors as crystallisation inhibitors, modifies the atomic arrangement, which has apparently become too compact spatially, of the crystal structure of the hBN, in that the arrangement starts to expand concentrically, the applied external pressure in the reaction chamber, however, preventing a free expansion to any volume. According to the invention, the amorphous ultrahard phase aBN-2 is thus formed.

In the process according to the invention, it is also possible to use the pressure during synthesis and conversion as a variable parameter at high temperature. While it is absolutely necessary to set the pressure precisely for generating cubic boron nitride crystals, if good crystal quality is to be achieved, the pressure in the process according to the invention is allowed to increase as the temperature rises, in order to move the reaction in the boron nitride phase system in one direction. Therefore, according to the invention the pressure and the temperature are controlled independently of one another.

The process according to the invention can also be carried out successfully using turbostratic boron nitride as the starting material, instead of hBN, for producing ultrahard aBN-2. The three-dimensional crosslinking mechanism then takes a symmetrically different course. Crosslinking no longer proceeds in the direction of the layered platelets of hBN, but along the grain boundaries of the swirled crystal lattice structures of the turbostratic boron nitride. The hexagonal boron nitride however, because of its crystal lattice layer structure, is the preferred starting material for the invention.

Amorphous ultrahard material based on boron nitride, can be produced according to the process explained according to the invention.

The use of the solvent catalysts makes it possible to achieve complete dissolution of the crystal lattice structure of the boron nitride employed. The inhibitor, due to its static distribution, prevents a general reconversion into one of the crystalline modifications of the boron nitride. Therefore, aBN-2 is not found close to pyrophyllite, as the latter provides a growth pattern for crystal nuclei.

The apparatus used to prepare the amorphous ultrahard boron nitride according to the process according to the invention corresponds to an apparatus as described in WO 90/02704.

BRIEF DESCRIPTION OF THE INVENTION

The process according to the invention is described hereinafter with reference to the following examples and the accompanying drawings, wherein:

FIG. 1 shows a crystal lattice structure of a aBN;

FIG. 2 shows a crystal lattice structure of wBN;

FIG. 3 shows a crystal lattice structure of cBN;

FIG. 4 shows the structure of the amorphous boron nitride aBN-2 prepared according to the invention;

Figure 9:
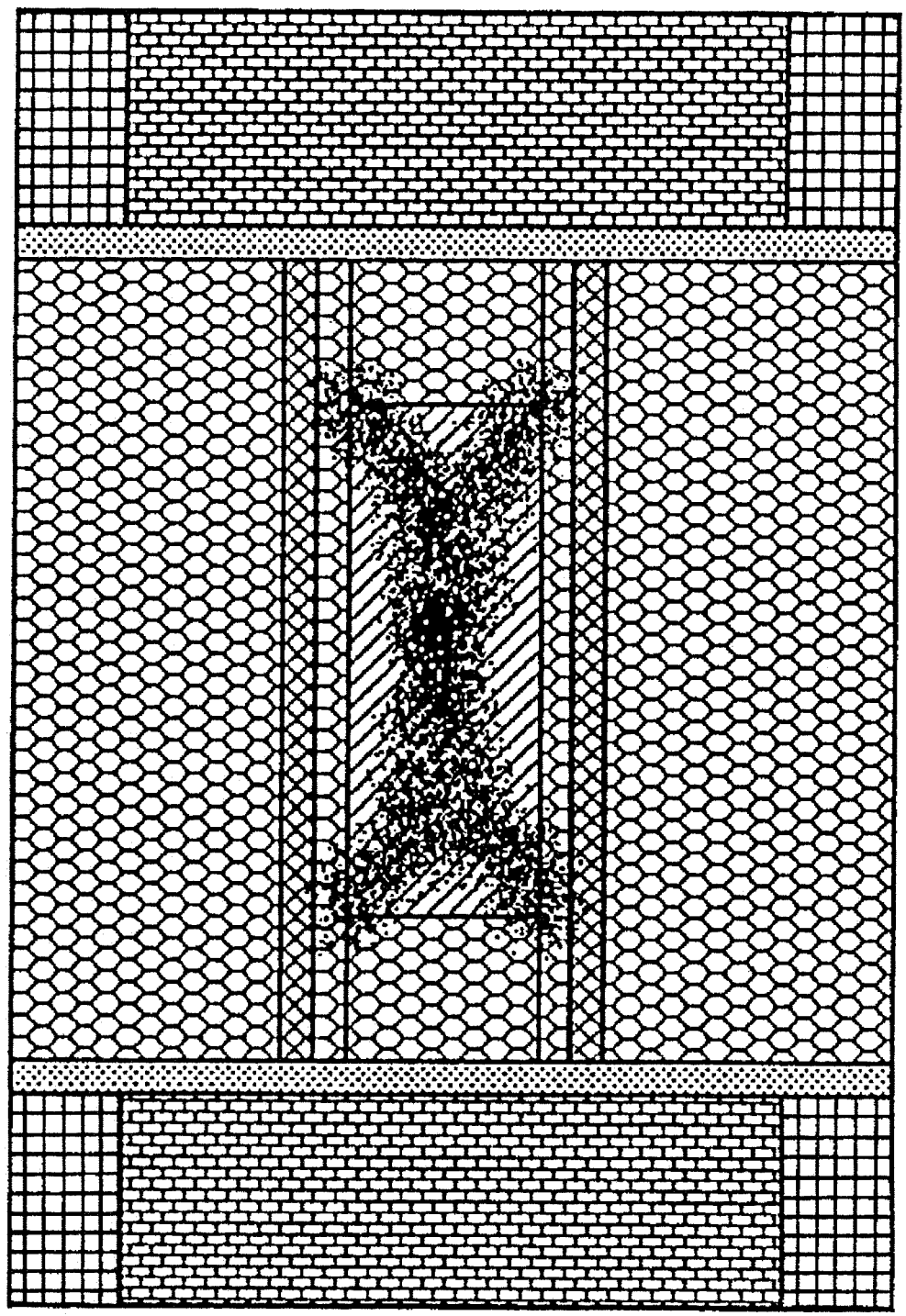

FIGS. 8(1), 8(2), 8(3), 8(4) and 8(5) show different mounting geometries for the starting materials of a high pressure insert in schematic form; and FIG. 9 shows yet another mounting geometry for the starting materials in the reaction chamber of a high pressure insert.

DETAILED DESCRIPTION OF THE INVENTION

Example 1

Commercially available hexagonal boron nitride hBN, grade C, specially rewashed, was mixed with an anhydrous acetone and precompacted in a hand press to give two pellets P1, P2 each having a height of 3 mm and a diameter of 3 mm, for example using a compacting force of 5 tons.

Figure 5:
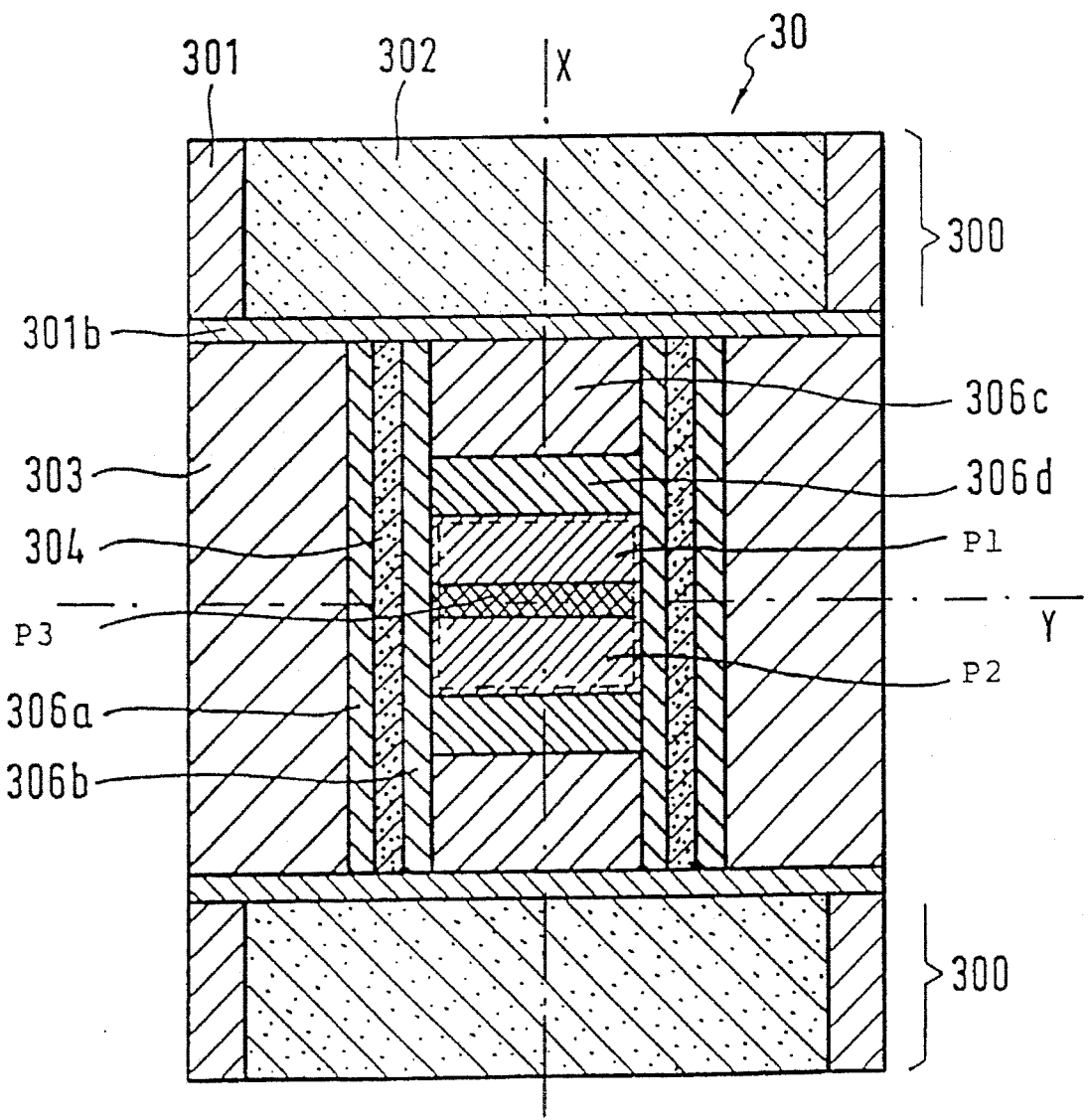
FIG. 5 shows the design of a high-pressure insert in cross-section.

Pure magnesium nitride $Mg_3N_2$ was admixed with 1% by volume of potassium permanganate ($KMnO_4$) and finely ground in an agate mortar. As before, this was compacted in a hand press to give a pellet P3 having a height of 0.5 mm and a diameter of 3 mm. The three pellets were then inserted in a sandwich arrangement, see FIG. 5, into the high-pressure insert 30 for the high-pressure press. The high-pressure insert 30, according to FIG. 5, is composed of cylindrically arranged pyrophyllite, graphite, corundum, molybdenum and steel members. The high-pressure insert 30 is also cylindrical and is designed so as to be rotationally symmetric about its longitudinal axis X and mirror symmetric about its transverse axis Y. In the centre, the three pellets P1, P3, P2 are seated on one another in the form of a sandwich. The three pellets are seated centrally in the tube 306b made of pyrophyllite, which on both sides projects above the pellets. Above and below, respectively, the pellets are sealed flushly by plugs, which are composed of two cover parts 306d and 306c of pyrophyllite and which are seated in the tube 306b. Pyrophyllite is a natural material, electrically insulating, which transmits pressure very effectively and in addition restratifies at the pressures required for the process according to the invention. Externally adjoining the pyrophyllite tube 306b there is a graphite tube 304, which serves to provide heating to generate the high temperatures desired at a correspondingly high current load. Again externally adjoining the graphite tube 304, there is a tube 306a of pressure-resistant, electrically insulating pyrophyllite. The external boundary is then formed by a thick-walled tube 303 of pyrophyllite. At the top and at the bottom the high-pressure insert is then covered and sealed by plates 301b of molybdenum or steel, which make contact with the graphite tube 304 and which serve as current leads. The ends are then formed by covers 300, which bear on the plates 301b and which have cover plates 302 of sintered corundum $Al_2O_3$, which are set in steel rings 301 and which serve as seating faces for the press rams in the press. The high-pressure insert 30, with hBN incorporated in its reaction chamber as well as the additives, especially the crystallisation inhibitors and optionally solvent catalysts, makes it possible to apply pressure and temperature, in a suitable manner and at the required level, to the boron nitride inside, in order to melt the latter completely at appropriately elevated temperatures and pressures and to enable the conversion into the amorphous boron nitride aBN-2. The starting materials for the synthesis in this context are immediately surrounded by pyrophyllite on all sides. The high-pressure insert 30 is then mounted in a high-pressure press, see WO/90/02704, and is compressed using a pressure of 70 kbar. By means of the graphite resistance heater 304 incorporated in the high-pressure insert 30, the temperature of 1850° C. is generated and the materials enclosed in the high-pressure insert 30 are held under these pressure and temperature conditions for one hour. By switching off the heat source for the high-pressure insert, the melted materials in the reaction chamber are quenched, whereupon pressure relief is carried out and the pressure applied to the high-pressure insert 30 is taken back to atmospheric pressure. The mixture now obtained from the reaction chamber, containing boron nitride, is further investigated by optical and electronic microscope. In this case, a proportion of 15% by volume of amorphous ultrahard boron nitride aBN-2 was found.

Example 2

Commercially available grade C hBN specially rewashed, was admixed with a 0.05% solution of potassium permanganate in distilled water and dried for 24 hours at room temperature. Two pellets of the dried material, having a height of 2.5 mm and a diameter of 3 mm, were then prepared by compacting. These pellets, together with two pellets of pure magnesium, having a height of 0.5 mm and a diameter of 1 mm, in an alternating, stratified arrangement were inserted into the reaction chamber of the high-pressure insert (30) according to FIG. 5. As in Example 1, the pressure and temperature were then established and held for one hour. The quenched composition was taken from the reaction chamber and examined with regard to its conversion rate and the content of amorphous ultrahard boron nitride aBN-2. In this instance, 50% by volume of aBN-2 were found in the reaction mixture, which were prepared according to the invention.

Example 3

In this experiment, thin platelets having a height of 0.3 mm and a diameter of 3 mm, of hBN, $Mg_3N_2$, Mg, $Li_2CO_3$, MgO, and $KMnO_4$, respectively, were stacked alternately and thus inserted into the reaction chamber of the high-pressure insert according to FIG. 5. Pressure and temperature were then generated, as explained in Example 1, and maintained for one hour. The contact zones of the hBN with the oxygen-containing additives in this example became considerably more amorphous than the zones of the other additives which do not act as crystallisation inhibitors. This was established by examination using TEM and optical microscopes.

Example 4

A pellet having a height of 5 mm and a diameter of 3 mm was prepared by mixing 80% by volume of grade C hBN, specially rewashed, 10% by volume of pure Mg, 5% by volume of pure $Mg_3N_2$, 4% by volume of distilled $H_2O$ and 1% by volume of $KMnO_4$ and precompacting in a hand press, and was inserted into the reaction chamber of the high-pressure insert according to FIG. 5. Thereupon, the compacting force was increased to the level of 105 tons required for carrying out the process. The temperature generated by the graphite resistance heater in the high-pressure insert was slowly raised from 20° to 1300° C. over a period of 20 minutes, then held for 20 minutes at a constant 1300° C. in order to achieve calcination. The temperature was then raised to 1750° C. over a period of 5 minutes. During this process, output fluctuations of the heater were observed in the temperature range around 1650° C., which suggest reactionary changes in the synthesis mixture, in particular a temperature increase which at the same time indicates that the temperatures required to render the melted hBN amorphous have been achieved in the interior of the high-pressure insert, i.e. in the reaction chamber.

Using the design and the procedure according to Example 4, a proportion of 20% by volume of ultrahard aBN-2 was detected in the synthesised composition obtained by subsequent quenching.

Example 5

Into a cylinder of precompacted hBN according to Example 1, having a height of 5 mm and a diameter of 3 mm, a compacted cylinder having a height of 2 mm and a diameter of 1 mm is incorporated centrally, which comprises 97% by volume of Mg, 2% by volume of $Mg_3N_2$ and 1% by volume of $KMnO_4$. This is placed into the reaction chamber of the high-pressure insert 30 according to FIG. 5 and is then inserted into the high-pressure press and, as explained in Example 4, subjected to pressure and temperature. The different geometry of the design, compared to Example 4, in this case provides for improved conversion of the hBN, in the boundary region of the cylinder, into aBN-2. This region is situated in the immediate radiation field of the IR radiation of the graphite resistance heater and is a zone with low temperature losses.

The examples illustrate that, in preparing aBN-2 by synthesis and conversion of hBN with the addition of crystallisation inhibitors and optionally solvent catalysts, the outcome can be affected by the chemical composition of the materials involved, by the mounting geometry selected in the reaction chamber, by heating and pressure control and by pretreating the starting materials.

Instead of the potassium permanganate used as the oxygen donor in the examples, $H_2O_2$ or other peroxides are also suitable. It is found, however, that potassium plays an additional role as a carrier element for the synthesis, i.e. during indiffusion of the reaction products formed by the crystallisation inhibitors, as, for example, in the case of the oxygen donors of a boron suboxide and incorporation thereof into the crystal layer structures of the boron nitride.

Figure 6:
FIG. 6 shows a TEM picture of amorphous boron nitride aBN-2 prepared according to the invention.

FIG. 6 shows a TEM picture, at an extreme enlargement of 250,000-fold, of amorphous boron nitride aBN-2, prepared according to Example 2, many small spherical centres forming in the boron nitride material itself, in which centres the dissolution of the hexagonal boron nitride structure, i.e. of the crystal lattice layer structure, is initiated.

Figure 7:
FIG. 7 shows an optical microscope picture of amorphous boron nitride aBN-2 prepared according to the invention.

In FIG. 7, the microstructure of aBN-2 obtained according to the process according to the invention using potassium permanganate as a crystallisation inhibitor according to Example 2, is illustrated in an optical microscope picture shown in phase contrast in 500 fold enlargement.

FIGS. 6 and 7, in particular, show the absence of any symmetric elements, such as edges, angles, holo-hedra, which are after all typical of crystalline substances of boron nitride. FIG. 6 shows the microstructure type which may be ideal, for example, for use in tools, and which proves that even at high enlargements none of the features typical for crystal nuclei as mentioned above are present.

FIGS. 8(1), 8(2), 8(3), 8(4) and 8(5) show various mounting geometries for the starting materials for the synthesis of ultrahard amorphous boron nitride according to the process according to the invention for the reaction chamber of a high-pressure insert according to FIG. 5. In these figures the dotted regions show the disposition of crystallisation inhibitors, optionally in conjunction with catalysts, the hatched regions show the disposition of the hexagonal or turbostratic boron nitride as the starting material, and the diffuse regions indicate the zones in which the amorphous ultrahard boron nitride is formed preferentially.

FIG. 9 shows a mounting geometry for the starting materials in the reaction chamber of a high-pressure insert, which leads to the formation of ultrahard boron nitride in optimum yield in an essentially hourglass-shaped region.

I claim:

1. A process for preparing an amorphous ultrahard material based on boron nitride and able to scratch diamond from a starting material containing crystalline hexagonal or crystalline turbostratic boron nitride, said starting material having a structure with crystal lattice layers, wherein the starting material is compressed at pressure of at least 70 Kbar and heated to temperatures of at least 1650° C. until a boron nitride melt is obtained, the boron nitride melt formed is quenched by shutting off a heat supply, and the quenched boron nitride melt is then relieved of the pressure, and wherein the hexagonal or turbostratic boron nitride of the starting material is treated in the presence of a crystallisation inhibitor, said crystallisation inhibitor being an oxygen donor which is a chemical substance releasing oxygen and which is a strong oxidant that reacts with the boron nitride of the starting material at pressures of at least 70 Kbar and at temperatures of at least 1650° C. and whose reaction products are incorporated into crystal lattice layers of the boron nitride; said oxygen donor being a peroxide or a compound containing alkali metal and/or alkaline earth metal.

2. A process according to claim 1, wherein the oxygen donor only becomes active on reaching a temperature of at least 1200° C. and releases oxygen which penetrates into the boron nitride crystal lattice layers and crosslinks these layers with the formation of a boron suboxide.

3. A process according to claim 1, wherein pressure on the boron nitride in the starting material and on the crystallisation inhibitors is increased with an increase in the temperature.

4. A process according to claim 1, wherein the pressure and temperature acting on the boron nitride in the starting material and on the crystallisation inhibitor are sufficiently high to effect partial mutual crosslinking of the boron and nitrogen atoms of the boron nitride crystal lattice layers.

5. A process according to claim 1, wherein, based on 100% by weight of hBN, from at least 0.001 to approximately 10% by weight of the crystallisation inhibitors, are present.

6. A process according to claim 1, wherein the crystallisation inhibitor comprises at least one of potassium permanganate, lithium carbonate and magnesium oxide.

7. A process according to claim 1, wherein the boron nitride in the starting material and the crystallisation inhibitor is treated in the presence of a catalyst.

8. A process according to claim 7, wherein the catalyst comprises at least one of lithium, magnesium, calcium, lithium nitride, magnesium nitride and calcium nitride.

9. A process according to claim 7, wherein, based on 100% by weight of boron nitride as the starting material, from approximately 1 to 50% by weight of catalyst is present.

10. A process according to claim 7, wherein the boron nitride used in the starting material and the crystallisation inhibitor as well as the catalyst are compression-molded, either separately or in mixtures, into identical and/or different moldings, and one or more moldings of identical and/or different composition are loaded into a reaction chamber, in which the moldings are subjected to the same pressure and temperature.

11. A process according to claim 10, wherein the starting material is treated in a reaction chamber bounded by pyrophyllite.

* * * * *